US010559060B2

(12) United States Patent
Noh et al.

(10) Patent No.: US 10,559,060 B2
(45) Date of Patent: Feb. 11, 2020

(54) METHOD AND APPARATUS FOR REAL TIME IMAGE DISTORTION COMPENSATION IN IMMERSIVE THEATER SYSTEM

(71) Applicant: KOREA ADVANCED INSTITUTE OF SCIENCE AND TECHNOLOGY, Daejeon (KR)

(72) Inventors: Junyong Noh, Daejeon (KR); Jungjin Lee, Daejeon (KR); Sangwoo Lee, Daejeon (KR); Bumki Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/834,195

(22) Filed: Dec. 7, 2017

(65) Prior Publication Data
US 2018/0204304 A1 Jul. 19, 2018

(30) Foreign Application Priority Data
Jan. 19, 2017 (KR) .......................... 10-2017-0008968

(51) Int. Cl.
G06T 3/00 (2006.01)
G06T 15/10 (2011.01)
G06T 17/20 (2006.01)
H04N 9/31 (2006.01)

(52) U.S. Cl.
CPC .......... *G06T 3/005* (2013.01); *G06T 3/0018* (2013.01); *G06T 15/10* (2013.01); *G06T 17/20* (2013.01); *H04N 9/3147* (2013.01); *H04N 9/3185* (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 2009/0059096 A1* | 3/2009 | Yamamoto | G06T 3/0081 348/746 |
| 2009/0256839 A1* | 10/2009 | Bastian | G06Q 10/02 345/419 |
| 2014/0095223 A1* | 4/2014 | Oxenham | G06Q 10/02 705/5 |
| 2015/0077584 A1* | 3/2015 | Kunieda | G03B 21/147 348/222.1 |

(Continued)

FOREIGN PATENT DOCUMENTS

| | | |
|---|---|---|
| JP | 2014-027651 | 2/2014 |
| KR | 10-2004-0056489 | 7/2004 |

(Continued)

*Primary Examiner* — Jeffrey J Chow

(57) ABSTRACT

The present invention includes a) creating geometry data of a theater screen, and mapping position information of seating on the geometry data to reconstruct a virtual theater structure, b) generating a grid mesh for each seat of the theater screen without changing edges of the theater screen, and c) generating a compensation map with minimized distortion of the grid mesh for each seat, and based on this, single-sampling compensating a pixel of an image to be displayed on the theater screen by the compensation map.

12 Claims, 8 Drawing Sheets

(56) References Cited

U.S. PATENT DOCUMENTS

| | | | | |
|---|---|---|---|---|
| 2016/0080710 A1* | 3/2016 | Hattingh | ............... | H04N 9/3185 |
| | | | | 348/52 |
| 2016/0127723 A1 | 5/2016 | Kim et al. | | |
| 2017/0318283 A1* | 11/2017 | Watson | ................ | H04N 13/366 |
| 2018/0335832 A1* | 11/2018 | Hardy | ..................... | G06F 3/011 |
| 2019/0105568 A1* | 4/2019 | Platt | ......................... | A63F 13/54 |

FOREIGN PATENT DOCUMENTS

| KR | 10-2009-0080709 | 7/2009 |
|---|---|---|
| KR | 10-2014-0079701 | 6/2014 |
| KR | 10-2015-0039166 | 4/2015 |
| KR | 10-1489261 | 4/2015 |
| KR | 10-2015-0141171 | 12/2015 |
| KR | 10-2016-0031869 | 3/2016 |
| KR | 10-2016-0051963 | 5/2016 |

\* cited by examiner

FIG. 5
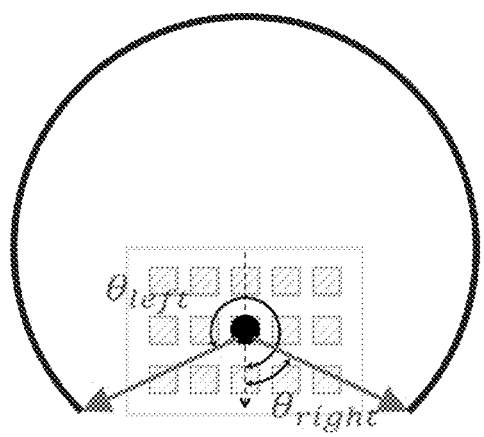
Top View
(a)
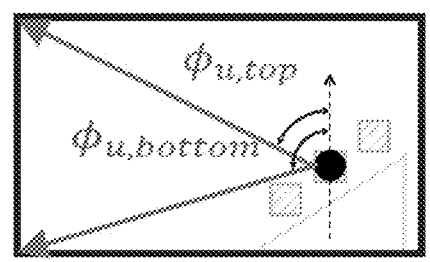
Left Side View
(b)
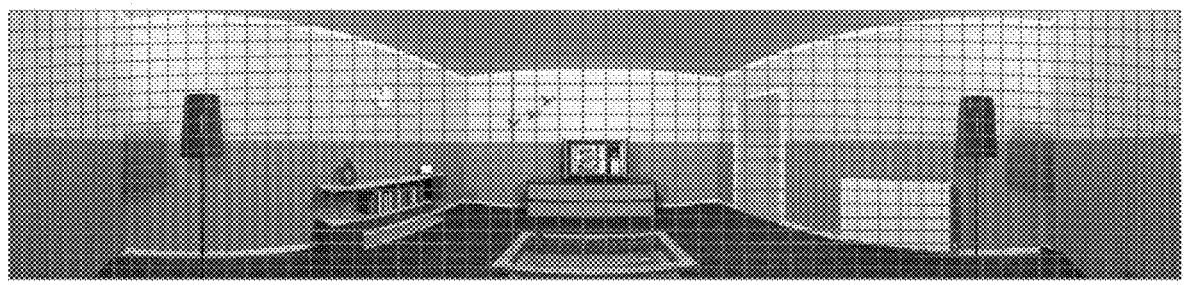
(c)

METHOD AND APPARATUS FOR REAL TIME IMAGE DISTORTION COMPENSATION IN IMMERSIVE THEATER SYSTEM

CROSS-REFERENCE TO RELATED APPLICATION

This application claims priority of Korean Patent Application No. 10-2017-0008968, filed on Jan. 19, 2017, in the KIPO (Korean Intellectual Property Office), the disclosure of which is incorporated herein entirely by reference.

BACKGROUND OF THE INVENTION

Field of the Invention

The present disclosure relates to a method for real time content viewpoint distortion compensation in an immersive theater system, and more particularly, to a method and apparatus for real time content viewpoint distortion compensation in an immersive theater system that allows an audience to play immersive content with uniform quality irrespective of the theater structure or seating arrangement, and performs image conversion in one step, dissimilar to the conventional conversion method requiring two or more image conversion processes depending on the theater structure, thereby minimizing image quality reduction caused by image conversion and achieving rapid conversion.

Description of the Related Art

ScreenX or IMAX Dome gives the stereoscopic impression to image using multiple screens dissimilar to classical theaters using a single 2-dimensional flat screen. As shown in FIG. 1, ScreenX provides image with a wider angle of view than image displayed with a single screen, by using one front screen and a pair of extended screens successively connected to the left and right sides of the front screen.

As shown in FIG. 1, ScreenX basically displays image on the extended screens extending from the front screen in three dimensions by perspective, and in turn, image distortion occurs on the front screen. If seating is located at the exact center of the theater, image distortion may be less likely to occur, but if not so, there is concern that left-bias distorted image or right-bias distorted image may be provided to the audience. Korean Patent Application Publication No. 10-2016-0051963, published on May 12, 2016, mentioned this problem, and in paragraph [0004], pointed out the problem that there are variations in ScreenX or IMAX image being viewed due to a difference of seating position in the theater, and regarding this problem, Korean Patent Application Publication No. 10-2016-0051963 proposed an approach to provide seating-dependent image to viewers beforehand.

However, the number of viewers who want to purchase seats after seeing seating-dependent sample image prior to watching movie is not larger than the number of viewers who do not want to, and if seating disparity is small at the first onset, this procedure will be unnecessary.

Currently, as a method for minimizing seating-dependent image disparity, an approach to minimize seating-dependent distortion by performing IMR warping (called primary sampling) of original content (for example, ScreenX image), followed by geometry compensation (called secondary sampling) is suggested.

However, it should be noted that when even digital image is subjected to conversion, not copying, the image quality is degraded, and image conversion leads to a time loss.

SUMMARY OF THE INVENTION

The present disclosure is directed to providing a method and apparatus for real time content viewpoint distortion compensation in an immersive theater system in which data conversion processing is performed by single sampling, thereby minimizing the time taken to display image, and causing no degradation in converted image.

The object can be achieved, according to the present disclosure, through a) creating geometry data of a theater screen, and mapping position information of seating on the geometry data to reconstruct a virtual theater structure, b) generating a grid mesh for each seat of the theater screen without changing edges of the theater screen, and c) generating a compensation map with minimized distortion of the grid mesh for each seat, and based on this, single-sampling compensating a pixel of an image to be displayed on the theater screen by the compensation map.

The object can be achieved, according to the present disclosure, through a memory configured to load a 3-dimensional structure file of at least one of performing-arts venue and seating, and a graphics processing unit configured to create geometry data of the theater screen by referring to the structure file, map position information of seating on the geometry data to reconstruct a virtual theater structure, generate a grid mesh for each seat of the theater screen, generate a compensation map with minimized distortion of the grid mesh for each seat, and based on this, single-sampling compensate a pixel of an image to be displayed on the theater screen by the compensation map.

According to the present disclosure, immersive content is optimized for the displaying space and thus can be displayed with high quality irrespective of positions, and compensation of immersive content through single sampling has little or no image quality degradation caused by conventional image compensation performed twice.

BRIEF DESCRIPTION OF THE DRAWINGS

The above and other features and advantages will become more apparent to those of ordinary skill in the art by describing in detail exemplary embodiments with reference to the attached drawings, in which:

FIG. 5 shows coordinate system setting when the theater screen is in cylindrical shape.

In the following description, the same or similar elements are labeled with the same or similar reference numbers.

DETAILED DESCRIPTION

Figure 1:
FIG. 1 is a reference diagram illustrating ScreenX.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 2:
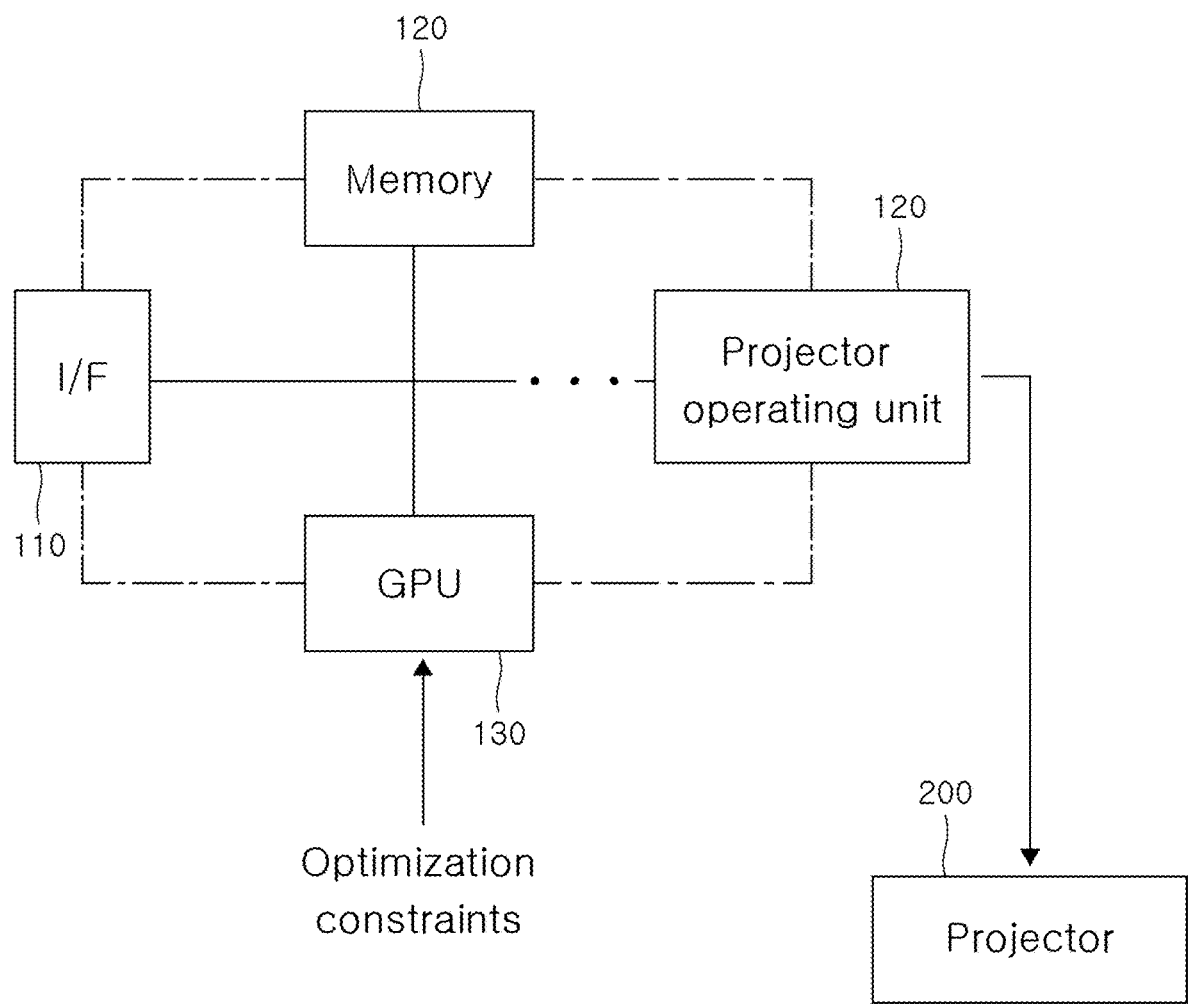
FIG. 2 is a conceptual diagram of an apparatus for real time content viewpoint distortion compensation in an immersive theater system according to an embodiment of the present disclosure.

FIG. 2 is a conceptual diagram of an apparatus for real time content viewpoint distortion compensation in an immersive theater system (hereinafter referred to as "compensation apparatus") according to an embodiment of the present disclosure.

The compensation apparatus 100 according to the embodiment may include an interface unit 110, a memory 120, a graphics processing unit (GPU) 130, and a projector operating unit 140.

The interface unit 110 is connected to another computing device or storage via a network or with a wired cable to obtain image data, and in addition, a 3-dimensional (3D) structure file (for example, a CAD file) for the theater or performing-arts venue.

The structure file obtained through the interface unit 110 is loaded on the memory 120, and the GPU 130 may create geometry data of the theater screen by referring to the structure file.

Furthermore, the GPU 130 maps seating position information on the geometry data, and reconstructs a virtual theater structure to generate a virtual theater structure having a data file format. Here, 3D geometry forms a triangle structure using straight lines connecting points on 3D coordinates, and refers to the representation of a 3D stereoscopic structure as a triangle structure.

When 3D coordinates of the seats are included in geometry data, viewing angles of the seats in the left-right and up-down directions with respect to the seats are calculated. When the viewing angles of the seats are calculated, the shape of image viewed from the seats and distortion quantity can be calculated.

After the virtual theater structure is constructed, the GPU 130 may create a grid mesh for each seat. The grid mesh may be created based on the viewpoint from each seat with respect to the position of each seat. In this instance, the grid mesh may be created using different coordinate systems depending on the type of theater screen.

1) In the case of a three-screen (for example, ScreenX) having "⊏" shape, representation in the xy coordinate system with the seated viewer's viewing angle being projected onto the three-screen.

2) In the case that the theater screen is in cylindrical shape, for example, in the case that the screen surrounds the seats, representation in the cylindrical coordinate system.

3) In the case that the theater screen is in dome shape, representation in the fisheye coordinate system.

This will be described with reference to FIGS. 3 to 6.

Figure 3:
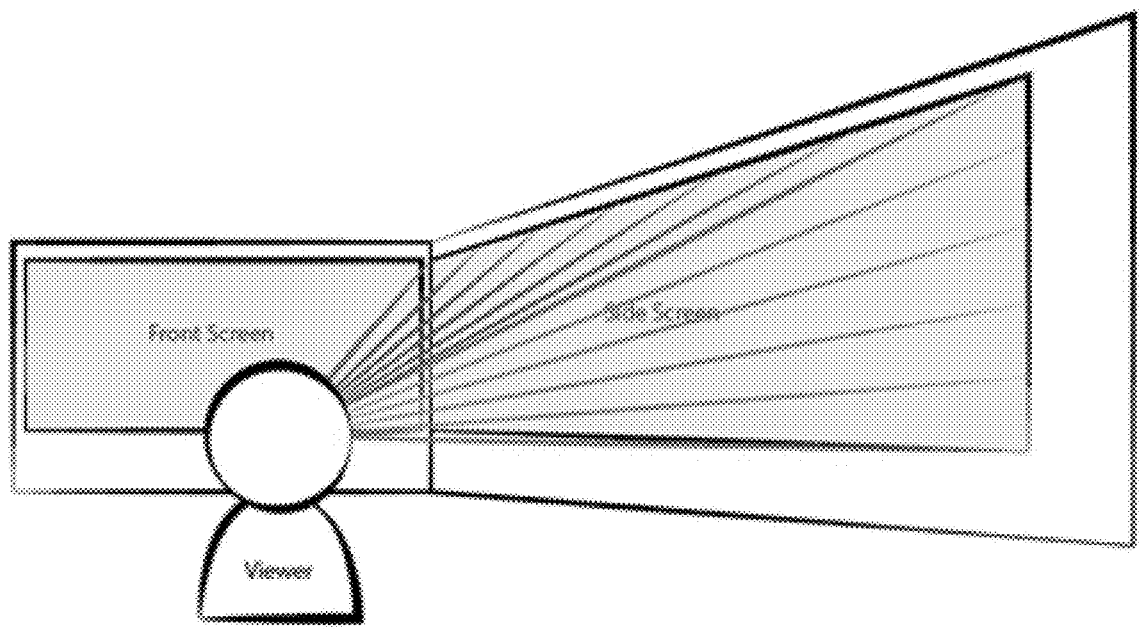
FIGS. 3 and 4 show coordinate system setting when the theater screen is a three-screen.
Figure 4:
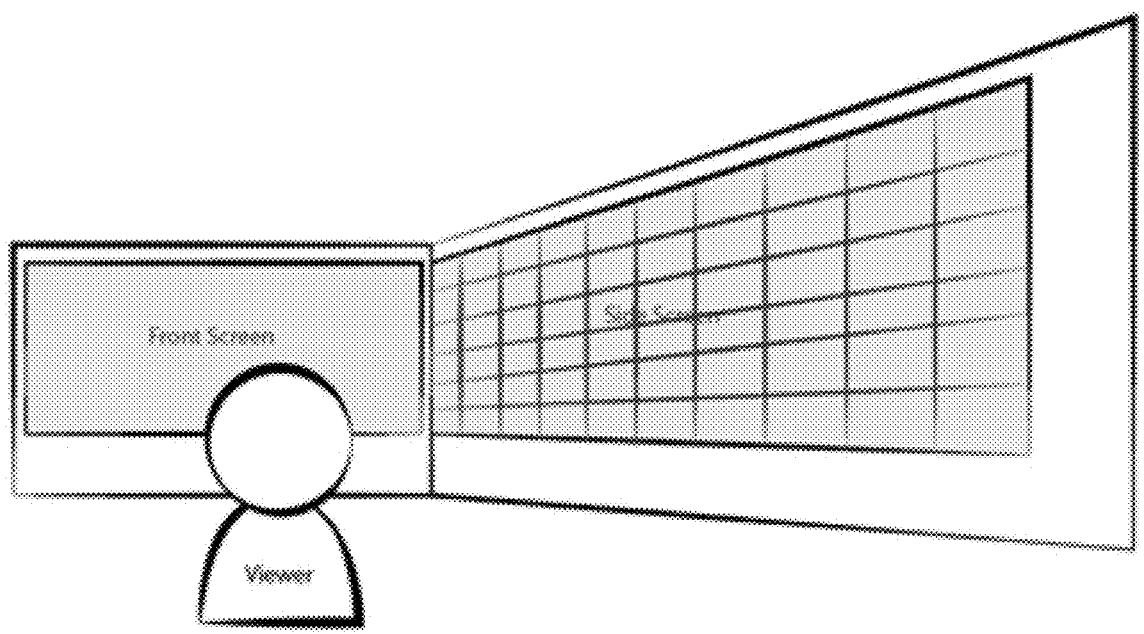

First, FIGS. 3 and 4 show coordinate system setting when the theater screen is a three-screen.

Referring to FIGS. 3 and 4, it is shown that the coordinate system of the side screen is set based on the seated viewer's viewing angle. The three-screen is implemented to display the perspective in image using the side screens extending in a different direction from the front screen, and due to the perspective, as the distance from the viewer is closer, image is enlarged, and in the contrary case, image is reduced. This equally appears across the field of view of the viewer really sitting in the seat, and the three-screen may make representations in the rectangular coordinate system with varying grid sizes depending on the perspective, i.e., the distance. FIG. 4 shows the grid mesh partitioned in the form of grid by the rectangular coordinate system.

Next, FIG. 5 shows coordinate system setting when the theater screen is in cylindrical shape.

Referring to FIG. 5, it can be seen that when the theater screen is in cylindrical shape, the screen is equally placed with respect to the seat. In this case, the grid mesh may be expressed in angles based on the height of the cylindrical screen and the angle of view. (A) of FIG. 5 shows left and right angles of view $\Theta$left, $\Theta$right with respect to the seat, (B) of FIG. 5 shows the screen height, and (C) of FIG. 5 shows the grid mesh created using the cylindrical coordinate system.

Figure 6:
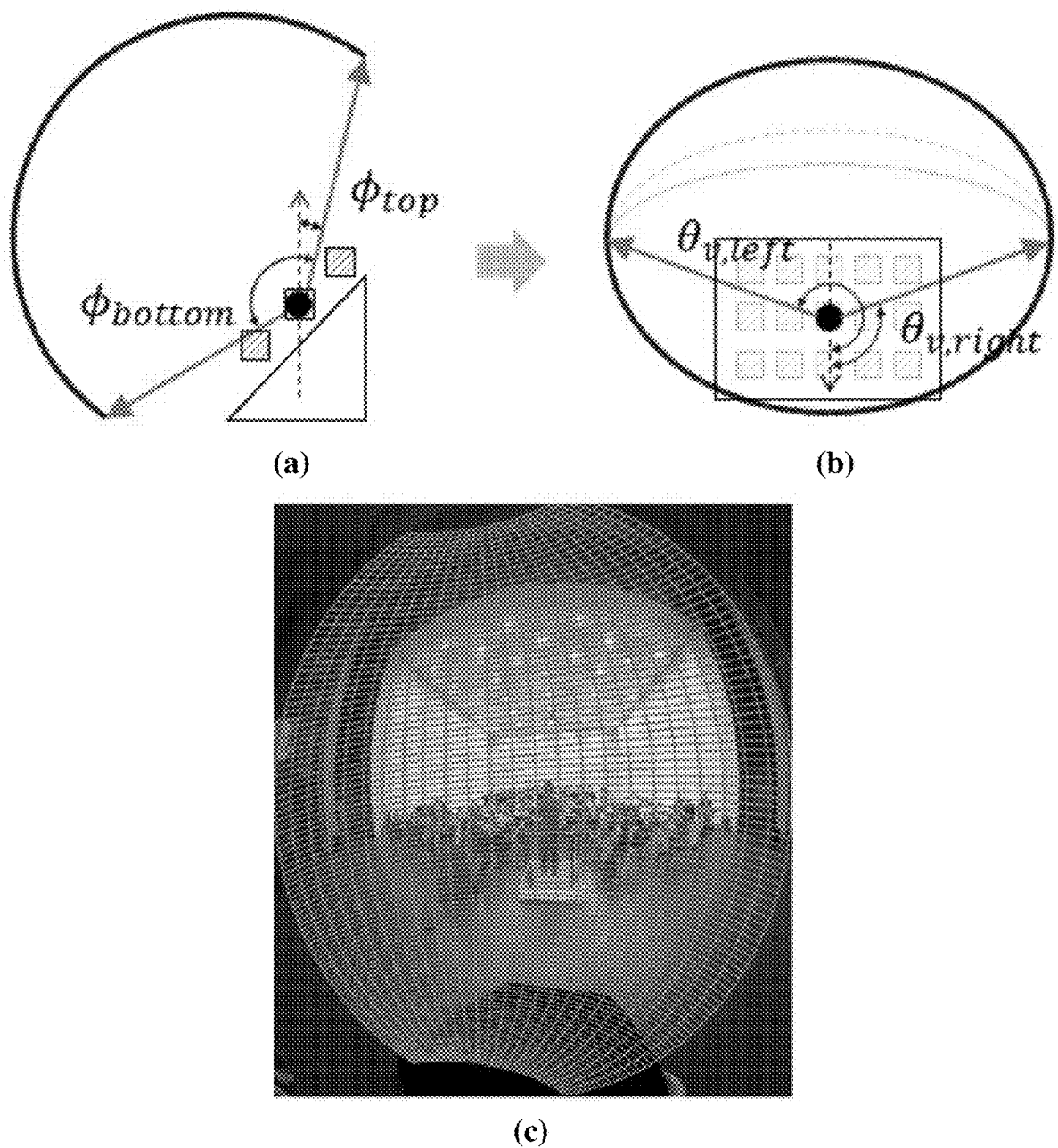
FIG. 6 shows coordinate system setting when the theater screen is in dome shape.

FIG. 6 shows coordinate system setting when the theater screen is in dome shape.

Referring to FIG. 6, when the theater screen is in dome shape, the viewing angle of the viewer sitting in the seat is deployed in two directions, i.e., the up-down direction and the left-right direction. (A) of FIG. 6 shows each of the top angle and the bottom angle $\Theta$top, $\Theta$bottom divided with respect to the seat 10, and (B) of FIG. 6 shows each of the left angle and the right angle $\Theta$v left, $\Theta$v right divided with respect to the seat 10. The grid mesh is expressed using four angles $\Theta$top, $\Theta$bottom, $\Theta$v left, $\Theta$v right with respect to the seat 10, and the representation of the grid mesh is as shown in (C) of FIG. 6. It can be seen that this type of grid mesh is similar to the grid mesh represented according to a method for setting the angle of view of fisheye lens. In general, when a grid is represented on a 2D plane in fisheye lens, the grid is represented as shown in (C) of FIG. 6.

As described above, when generating the grid mesh based on the type of theater screen, the GPU 130 should generate the grid mesh such that the grid mesh does not deviate from the edges of the theater screen or does not distort the shape of the theater screen. The grid mesh deviating from the theater screen does not have a space on which compensated image will be displayed, and the grid mesh distorting the structure of the theater screen has difficulty in applying compensated image as it is, so long as the theater screen is undistorted. Such constraints are referred to as "constraints" in the specification.

After the grid mesh of the theater screen is created based on the constraints, the GPU 130 may convert the grid mesh for each seat to the Laplacian coordinate system to locate regional viewpoint distortion of the theater screen.

The GPU 130 creates a compensation map with minimized grid mesh disparity dependent on the viewpoint for each seat by comparing the reference viewpoint, i.e., grid coordinates (referred to as "reference coordinates") of the viewpoint best represented in image projected onto the theater screen with the grid mesh dependent on the viewpoint for each seat.

Subsequently, the GPU 130 converts image data provided through the interface unit 110 in real time by referring to the compensation map, and subsequently, provides the image data to the projector operating unit 140. The projector operating unit 140 provides the image data compensated in real time by the compensation map to a projector 200, and the projector 200 projects the compensated image onto the theater screen.

Figure 7:
FIG. 7 shows image data before compensation by a compensation map.
Figure 8:
FIG. 8 shows image data compensated by a compensation map.

For reference, FIG. 7 shows image data before compensation by the compensation map, and FIG. 8 shows image data compensated by the compensation map.

Figure 9:
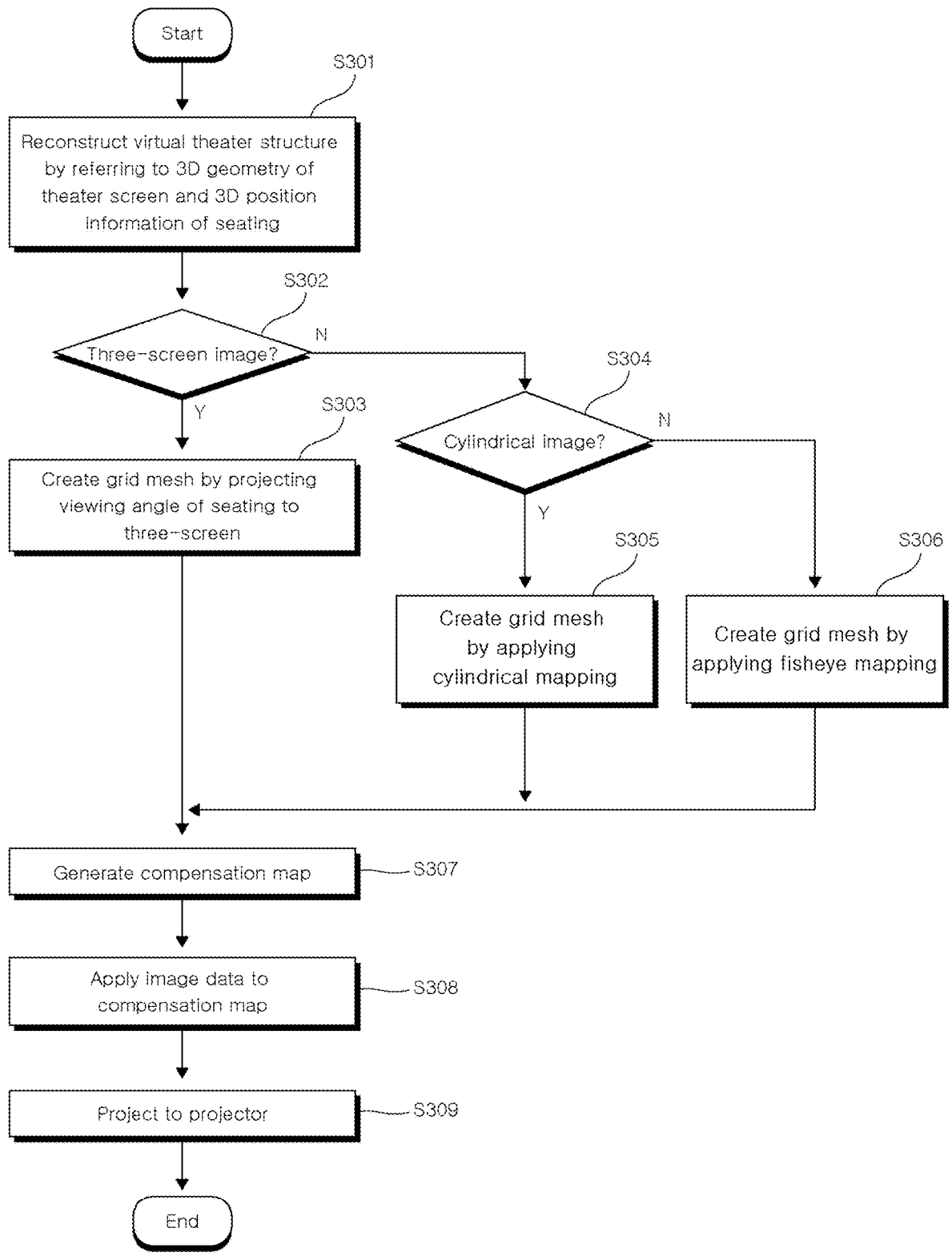
FIG. 9 is a flowchart of a method for real time content viewpoint distortion compensation in an immersive theater system according to an embodiment of the present disclosure.

FIG. 9 is a flowchart of a method for real time content viewpoint distortion compensation in an immersive theater system according to an embodiment of the present disclosure.

The method for real time content viewpoint distortion compensation in an immersive theater system (hereinafter referred to as "compensation method") according to the embodiment may be implemented by a computing device which is equipped with the GPU 130 and the memory 120, and a wired or wireless interface to receive external image data, and can provide the image data to an output device such as the projector 200. Here, the computing device may indicate the compensation apparatus according to the embodiment, or may be a device such as a personal computer, a server and a laptop computer, but in addition, the computing device may be an embedded device specialized for the theater system. However, the computing device is not limited thereto.

First, the compensation apparatus 100 reconstructs a virtual theater structure by referring to 3D geometry of the theater screen and 3D position information of seating (S301). The reconstructed theater structure may be created in a CAD file format and stored and loaded on the compensation apparatus 100.

Subsequently, the compensation apparatus 100 may create a grid mesh by the type of theater screen. The compensation apparatus 100 may determine the type of theater screen itself, or theater screen type information may be given to the compensation apparatus 100 by an operator.

If the theater screen is a three-screen (for example, ScreenX) (S302), the compensation apparatus 100 may create a grid mesh in the form of grid by applying the viewing angle of seating to the three-screen having perspective (S303). By comparison, when the theater screen is in cylindrical shape (S304), the compensation apparatus 100 may create a grid mesh of theater screen by applying cylindrical mapping. In this instance, the cylindrical theater screen may be expressed in the height of the theater screen and the viewing angle of seating, and its description follows the foregoing description made through FIG. 5.

Subsequently, when the theater screen is in dome shape, the compensation apparatus 100 may create a grid mesh of theater screen by applying fisheye mapping. The fisheye mapping can make spatial representations using angles in the up-down direction and angles in the left-right direction, i.e., four angles, with respect to the seat. In this instance, the shape of the formed grid mesh is as shown in (C) of FIG. 6.

When the grid mesh of the theater screen is created, the compensation apparatus 100 generates a compensation map by comparing the created grid mesh and a reference mesh (S307). The reference mesh is a mesh created with respect to the reference viewpoint, and in general, is created with respect to the seat facing the central height of the theater screen while viewing the center of the theater screen.

The compensation apparatus 100 creates a compensation map with minimized grid mesh disparity depending on the viewpoint for each seat by comparing grid coordinates (referred to as "reference coordinates") of the reference viewpoint best represented in image projected onto the theater screen with the grid mesh dependent on the viewpoint for each seat.

Subsequently, the compensation apparatus 100 converts image data in real time by referring to the compensation map (S308), and subsequently, provides the image data to the projector 200 to display the image (S309).

Figure 10:
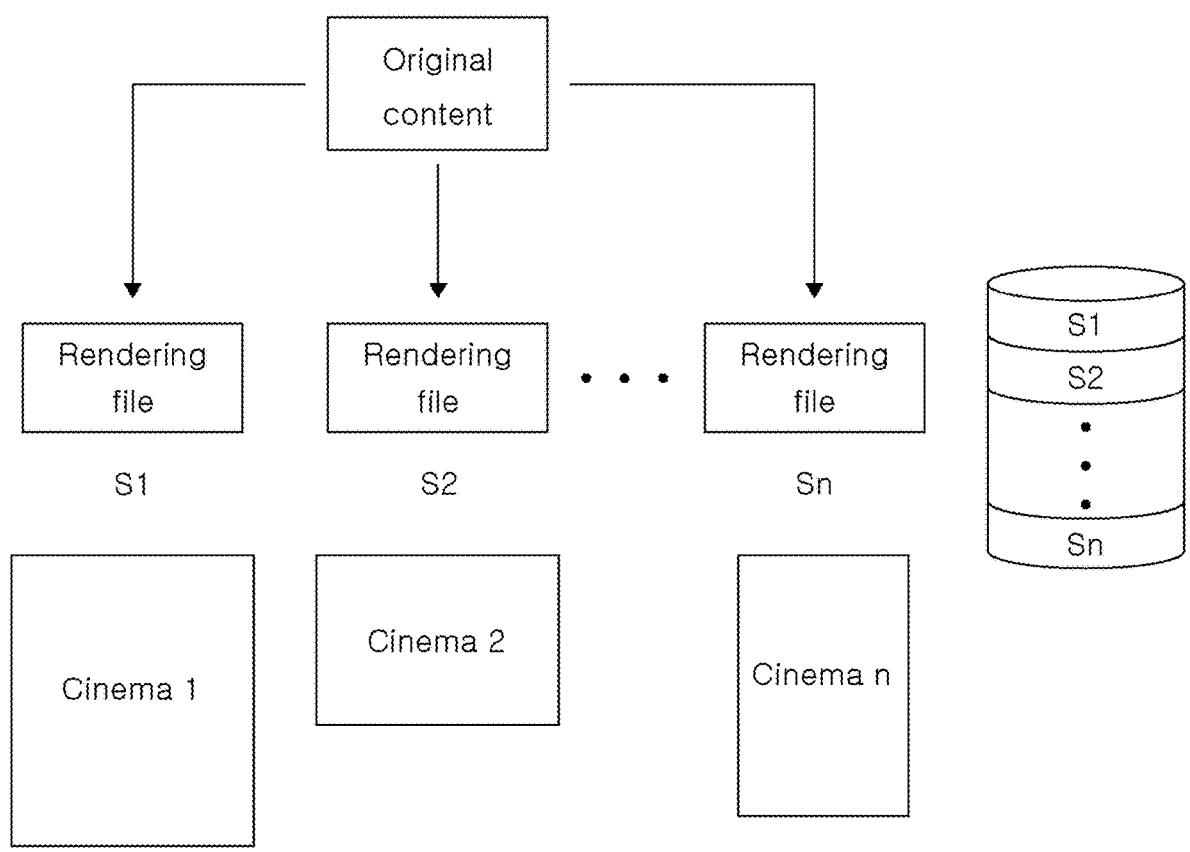
FIG. 10 is a reference diagram illustrating a comparison of a method for real time content viewpoint distortion compensation in an immersive theater system according to the present disclosure and the conventional compensation method.

FIG. 10 is a reference diagram illustrating a comparison of the method for real time content viewpoint distortion compensation in an immersive theater system according to the present disclosure and the conventional compensation method.

Referring to FIG. 10, the conventional compensation method needs original content sampling for each theater and each cinema. The conventional compensation method should perform IMR Warping by referring to the seating arrangement and theater structure of each cinema, followed by geometry compensation, to minimize the image disparity for each seat. After sampling of original content is performed twice, the content is stored in the database and picked up and played when screening a film.

Apart from the image quality degradation, the conventional compensation method is not so effective in content management and maintenance due to storing the image sampled twice for each cinema.

If the number of contents being screened in the corresponding theater is 10, when each of 10 contents is original content, contents converted by sampling 10 original contents are as much as the number of cinemas. For example, if the number of contents being screened is 10 and the number of cinemas is 20, 200 converted image data should be stored in the database.

When the number of films screened in one theater for a year and the number of cinemas is taken into account, the capacity of a storing medium required for a year and inconvenience in maintenance and management tends to gradually increase over time.

In contrast, note that the compensation method according to the present disclosure is not affected by the number of cinemas because one original content is converted in real time to fit the structural feature of cinema.

Because original content is automatically converted in real time based on the cinema structure, the seating arrangement relationship and the screen type, multiple image data converted for one original content is not needed, and there is no reason to store and manage the converted image data.

Moreover, the GPU 130 performs conversion once in real time, thereby preventing the quality degradation of image data, achieving higher image quality and faster image conversion rate and ensuring easier maintain and manage of original content than the conventional compensation method, but the conventional compensation method does not do so.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method for real time content viewpoint distortion compensation in an immersive theater system comprising:
   a) creating geometry data of a theater screen, and mapping position information of seating on the geometry data to reconstruct a virtual theater structure;
   b) generating a grid mesh for each seat corresponding to each of a plurality of seats in the theater screen without changing edges of the theater screen; and
   c) generating a compensation map with minimized distortion of the grid mesh for each seat, and based on this, single-sampling compensating a pixel of an image to be displayed on the theater screen by the compensation map,
   wherein the step c) comprises comparing grid coordinates of a reference viewpoint best represented in image projected onto the theater screen with the grid mesh dependent on the viewpoint for each seat, and creating a compensation map with minimized grid mesh disparity depending on the viewpoint for each seat,
   wherein the theater screen is one of a "⊏" shaped three-screen, a cylindrical screen in shape, and a dome screen in shape,
   wherein the grid mesh may be created using different coordinate systems depending on the type of theater screen, in the case of "⊏" shape, the grid mesh is represented by a xy coordinate system, in the case of cylindrical shape, the grid mesh is represented by a cylindrical coordinate system, and in the case of dome shape, the grid mesh is represented by a fisheye coordinate system.

2. The method for real time content viewpoint distortion compensation in an immersive theater system of claim 1, wherein the step b) comprises creating the same number of grid meshes as the number of seats.

3. The method for real time content viewpoint distortion compensation in a immersive theater system of claim 1, wherein when the theater screen is a "⊏" shaped three-screen, the grid mesh is generated by applying a viewing angle of a viewer with respect to the 3D position of seating to the three-screen.

4. The method for real time content viewpoint distortion compensation in an immersive theater system of claim 1, wherein when the theater screen is a cylindrical screen in shape, the grid mesh is created by defining the theater screen as a cylindrical shape, and referring to a height and an angle of the cylindrical theater screen with respect to the 3D position of seating.

5. The method for real time content viewpoint distortion compensation in an immersive theater system of claim 1, wherein when the theater screen is a dome screen in shape, the grid mesh is created by defining the theater screen as a dome shaped structure and applying an angle of view of a fisheye lens with respect to the 3D position of seating, and is created using up-down direction grid mesh and left-right direction grid mesh with respect to seating.

6. The method for real time content viewpoint distortion compensation in an immersive theater system of claim 1, after the step b), further comprising:
   converting the grid mesh for each seat to a Laplacian coordinate system.

7. An apparatus for real time content viewpoint distortion compensation in an immersive theater system comprising:
   a memory configured to load a 3-dimensional structure file of at least one of performing-arts venue and seating; and
   a graphics processing unit configured to create geometry data of the theater screen by referring to the structure file, map position information of seating on the geometry data to reconstruct a virtual theater structure, generate a grid mesh for each seat corresponding to each of a plurality of seats in the theater screen, generate a compensation map with minimized distortion of the grid mesh for each seat, and based on this, single-sampling compensate a pixel of an image to be displayed on the theater screen by the compensation map,
   wherein graphics processing unit compares grid coordinates of a reference viewpoint best represented in image projected onto the theater screen with the grid mesh dependent on the viewpoint for each seat, and creates a compensation map with minimized grid mesh disparity depending on the viewpoint for each seat, wherein the theater screen is one of a "⊏" shaped three-screen, a cylindrical screen in shape, and a dome screen in shape,
wherein the grid mesh may be created using different coordinate systems depending on the type of theater screen, in the case of "⊏" shape, the grid mesh is represented by a xy coordinate system, in the case of cylindrical shape, the grid mesh is represented by a cylindrical coordinate system, and in the case of dome shape, the grid mesh is represented by a fisheye coordinate system.

8. The apparatus for real time content viewpoint distortion compensation in an immersive theater system of claim 7, wherein the graphics processing unit is configured to create the same number of grid meshes as the number of seats.

9. The apparatus for real time content viewpoint distortion compensation in an immersive theater system of claim 7, wherein when the theater screen is a "⊏" shaped three-screen, the graphics processing unit is configured to generate the grid mesh by applying a viewing angle of a viewer with respect to the 3D position of seating to the three-screen.

10. The apparatus for real time content viewpoint distortion compensation in an immersive theater system of claim 7, wherein when the theater screen is a cylindrical screen in shape, the graphics processing unit is configured to create the grid mesh by defining the theater screen as a cylindrical shape, and referring to a height and an angle of the cylindrical theater screen with respect to the 3D position of seating.

11. The apparatus for real time content viewpoint distortion compensation in an immersive theater system of claim 7, wherein when the theater screen is a dome screen in shape, the graphics processing unit is configured to create the grid mesh by defining the theater screen as a dome shaped structure and applying an angle of view of a fisheye lens with respect to the 3D position of seating, and to create the grid mesh using up-down direction grid mesh and left-right direction grid mesh with respect to seating.

12. The apparatus for real time content viewpoint distortion compensation in an immersive theater system of claim 7, wherein the graphics processing unit is configured to convert the grid mesh for each seat to a Laplacian coordinate system.

* * * * *